(12) United States Patent
 Okulov

(10) Patent No.: US 7,856,902 B2
(45) Date of Patent: Dec. 28, 2010

(54) VARIABLE TRANSMISSION

(75) Inventor: Paul Okulov, Ville St-Laurent (CA)

(73) Assignee: Turbo Trac USA, Inc., Midland, TX (US)

( * ) Notice: Subject to any disclaimer, the term of this patent is extended or adjusted under 35 U.S.C. 154(b) by 731 days.

(21) Appl. No.: 11/494,615

(22) Filed: Jul. 28, 2006

(65) Prior Publication Data

US 2008/0022950 A1    Jan. 31, 2008

(51) Int. Cl.
*F16H 3/22*     (2006.01)
*F16H 1/14*     (2006.01)
*F16H 15/16*    (2006.01)

(52) U.S. Cl. ............................. 74/348; 74/417; 476/51
(58) Field of Classification Search ............... 74/348, 74/349, 417; 474/61–63, 83; 476/51–53, 476/54–58
See application file for complete search history.

(56) References Cited

U.S. PATENT DOCUMENTS

| | | | | |
|---|---|---|---|---|
| 1,081,799 A | * | 12/1913 | Whipple ........................ | 74/721 |
| 1,120,266 A | * | 12/1914 | Bradley ........................ | 476/56 |
| 1,844,239 A | * | 2/1932  | Boehme et al. ................ | 476/48 |
| 2,509,940 A | * | 5/1950  | Rennerfelt .................... | 476/49 |
| 2,697,365 A | * | 12/1954 | Williams ...................... | 475/218 |
| 4,905,529 A | * | 3/1990  | Nakano ........................ | 476/10 |
| 5,730,681 A | * | 3/1998  | Rondinelli .................... | 476/55 |
| 5,984,820 A |   | 11/1999 | Wedeniwski | |
| 6,001,042 A |   | 12/1999 | Raney | |
| 6,139,465 A | * | 10/2000 | Holliday ....................... | 476/52 |
| 6,471,618 B2| * | 10/2002 | Pavlov et al. ................. | 476/52 |
| 6,524,214 B1|   | 2/2003  | Cillessen | |
| 6,802,229 B1| * | 10/2004 | Lambert ....................... | 74/348 |
| 6,884,198 B1| * | 4/2005  | Hoogenberg ................. | 476/51 |

FOREIGN PATENT DOCUMENTS

WO  PCT/CA2007/001257     7/2007

* cited by examiner

*Primary Examiner*—Roger Pang
(74) *Attorney, Agent, or Firm*—Scott M. Oldham, Esq.; Hahn Loeser + Parks LLP

(57) ABSTRACT

A drive system suitable for use in a variable transmission with a plurality of rotatable and adjustable disk members, gear means adapted for contact with the plurality of disk members, carriage means for mounting the gear means and configured for axial movement along the axis of a rotatable drive shaft and a rotatable cone adapted for contact with the plurality of disk members, the cone and the conical gear means connected for relative rotation by the plurality of disk members, the disk members being adjustable transversely relative to the axis of rotation for maintaining positive contact with said rotatable cone.

22 Claims, 8 Drawing Sheets

VARIABLE TRANSMISSION

FIELD OF THE INVENTION

The present invention relates to a variable transmission and more particularly, the present invention relates to a drive system for use in a variable transmission and a transmission incorporating the drive system.

BACKGROUND OF THE INVENTION

Variable transmissions have been previously proposed in the art. One of the more current examples is the example provided by Raney, in U.S. Pat. No. 6,001,042, issued Dec. 14, 1999. The Raney arrangement provides a very useful continuously variable transmission with a ratio synchronizing system where a singular disk contacts a plurality of conical drive members coaxially arranged with the disk. The disk members are driven and impart motion to the disk which in turn is translated via differential gears such as planet and sun gear arrangements into useable power. The Raney arrangement, as previously noted is particularly useful; however variable transmissions must, in order to provide the greatest possible utility, be capable of providing output for a variety of torques. As in known in these arrangements, the different speeds provided for in the transmission as a result of providing a frusto conical drive member in contact with the disk. As will be realized by those skilled in the art, as the disk experiences increased torque, the traction force between the disk and the cone becomes increasingly elevated and, depending upon the traction fluid and coefficient of friction of the lubrication, slipping may occur or the conical drive gears may be damaged by metal-to-metal contact. In the situation where the damage occurs, this can result in cascading failure throughout the entire system.

In arrangements of this nature, simplification of the system is more pragmatic with the elimination of as many gears and clutches as possible and further with the greatest possible degree of contact between disk and cone for reduced stress over a variety of torque quantities.

In the instant invention, significant improvements have been made in the variable transmission to the extent that the limitations previously encountered in this art are now overcome.

SUMMARY OF THE INVENTION

One object of one embodiment of the present invention is to provide an improved variable transmission capable of withstanding high torque situations under a variety of speeds in a simplified arrangement.

A further object of one embodiment is to provide a drive system suitable for use in a variable transmission, comprising a plurality of rotatable and adjustable in a radial direction disk members, gear means adapted for contact with the plurality of disk members, carriage means for mounting the gear means and configured for axial movement along the axis of a rotatable drive shaft and a rotatable cone adapted for contact with the plurality of disk members, the cone and the gear means connected for relative rotation by the plurality of disk members, the disk members being adjustable transversely relative to the axis of rotation for maintaining positive contact with the rotatable cone.

Conveniently, the arrangement provides for a plurality of rotatable and adjustable disk members. The provision for the plurality circumvents the mechanical limitations associated with single disk arrangements and particularly mechanical stress experienced between the contact of the cone members and the disk as well as substantial discrepancies between the contacting surface of a single disk and the contacting surfaces of the cones, both of which are subject to wear. By providing additional disks, the force is effectively spread out over a greater area which has the effect of equalizing the pressure and thus potential damage, slipping and/or lubrication breakdown. The arrangement, in essence dissipates the stress over a greater number of areas and therefore more severe torque situations can be easily handled with the instant arrangement. It is important to note that a simple increase in the number of disks however does not solve the problem. This is due to the fact that given the rotational speed of the disks will be synchronized with rotational speed of affected contact trajectories of the cone(s), the rigidity of the disks will not allow even distribution of the load between them, even with the single cone system due to the deflection of the cone surface. Therefore, if disengagement of one of the disks were to occur it will cause severe overloading of the other disks and would also affect functionality of the disks speed differentiator.

The drive system indicated herein can be employed in any existing variable transmission with suitable retrofitting modifications. It is to be noted that the combination of the flexible disks, conical gear or set of independent gears meshing with opposed disks and cone provide for the primary power output. In this manner, other arrangements known, such as, for example, the Raney reference could be retrofit with the arrangement discussed herein.

According to a further object of one embodiment of the present invention there is provided a variable transmission, comprising a drive shaft, a plurality of rotatable and adjustable disk members, gear means adapted for contact with the plurality of disk members, carriage means for mounting the gear means and configured for axial movement along the axis of the drive shaft, at least one rotatable cone mounted for contact with the plurality of disk members, the cone and the gear means connected for relative rotation by the plurality of disk members, the disk members being adjustable transversely relative to the axis of rotation for maintaining positive contact with the rotatable cone and generating output power and differential gear means for receiving the output power.

The adjustable disk members, in one embodiment, may be made of a material that is elastically deformable so that full contact is made with the cones at all times and any variations in distance due to the presence of the clamping force can be easily accommodated by simple flex of the disks. Suitable materials for such an arrangement include steel, particularly bearing type steel, aluminum alloys, titanium, polymers including rubber, and the composites combining the above. These are exemplary; other examples will be readily appreciated by those skilled in the art.

As an alternative, the disk may comprise a substantially inflexible material with an elastomeric or elastically deformable periphery or further laying on a deformable and elastic support. As a further alternative, the elastic deformation may be achieved by peripherally oriented material capable of expanding the radius of the disks under rotation, i.e. by centripetal force or by compressive force from cones. Useful buckling in the elastic zone of the material can also be employed for achieving a substantial deformation of the peripheral part of the disk.

In respect of movement of the disks, the disks may be moved by the rotation of, for example, a single conical gear or a plurality of conical or bevel gears or, alternatively driven by the rotation of the cone which, in turn, would rotate the conical gear(s). Such gear means are not limited to toothed gears, but also can include traction devices.

In terms of adjustment of the disks, the carriage means may optionally include means for elevating or otherwise adjusting the vertical disposition of the gear(s) means within the carriage.

As a further object of one embodiment of the present invention, there is provided a variable transmission, comprising a drive shaft, a plurality of elastically deformable-disk members, gear means adapted for contact with the plurality of disk members, carriage means for mounting the gear means and configured for axial movement along the axis of the drive shaft, a plurality of rotatable cones mounted in coaxial relation about the plurality of disk members, the cones and the conical gear means connected for relative rotation by the plurality of disk members, the disk members being elastically and dynamically deformable transversely relative to the axis of rotation for maintaining positive contact with the cones for generating output power during rotation and differential gear means for receiving the output power.

Having thus generally described the invention, reference will now be made to the accompanying drawings illustrating preferred embodiments.

BRIEF DESCRIPTION OF THE DRAWINGS

Similar numerals are indicative of similar elements.

DETAILED DESCRIPTION OF THE PREFERRED EMBODIMENTS

Figure 1:
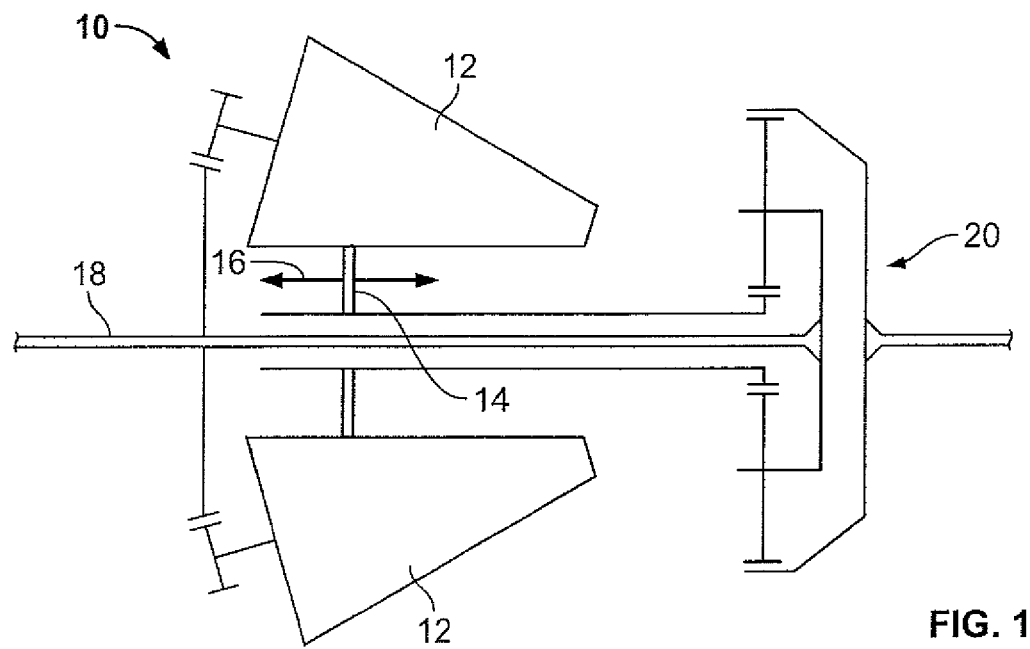
FIG. 1 is a schematic illustration in cross-section of a variable transmission.
Figure 1A:
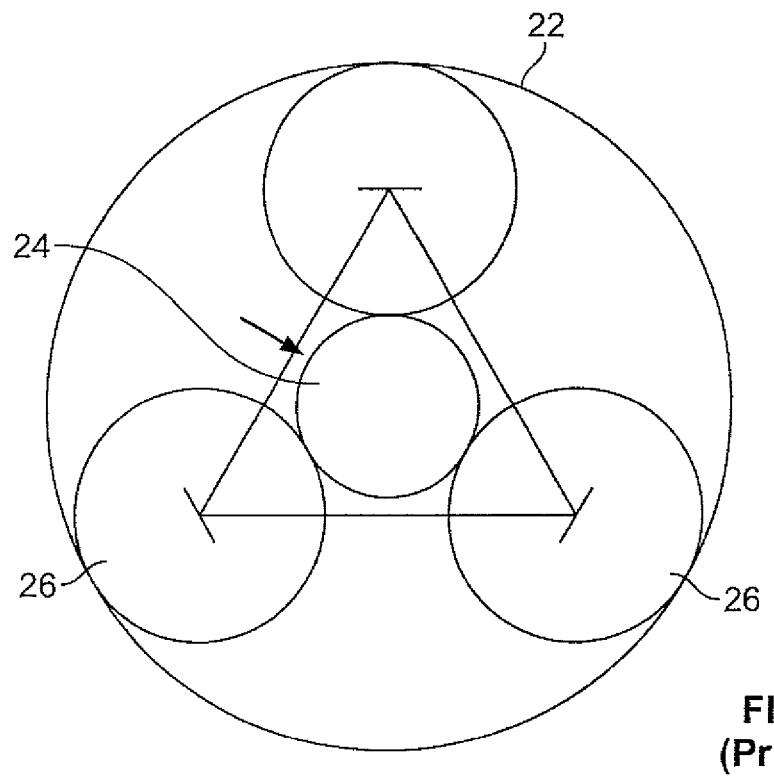
FIG. 1A is a front elevational schematic view of a typical ring planet sun gear system.

Referring now to FIG. 1, shown is a cross-sectional view of a general variable transmission, the example being globally denoted by numeral 10. As is generally known, the transmissions of this variety include a plurality of rotatable cone members 12 which are either driven independently by separate gear systems (not shown) as is known in the Raney transmission discussed herein previously in the background of the invention. The cone members are in contact with a disk member 14, which disk member is moveable in a parallel relation along the axis of a rotatable shaft 18, the disk being moveable in the direction indicated by the arrows 16. As is known, once the disk is moved either towards the apex of the cone or towards the base different speeds are experienced by the input shaft 18. The rotational energy is then transferred to a gear arrangement, broadly denoted by numeral 20 and shown in greater detail in FIG. 1A. The gear network or system 20 can include a conventional ring gear 22 with a sun gear 24 which sun gear is typically connected to the disk 14 shown in FIG. 1. A plurality of planet gears 26 cooperate with the sun gear 24 and ring gear 22 to result in the generation of output power. Generally speaking the ratio of diameters between the sun and planet determines an amount of torque transmitted by the disk.

Figure 2:
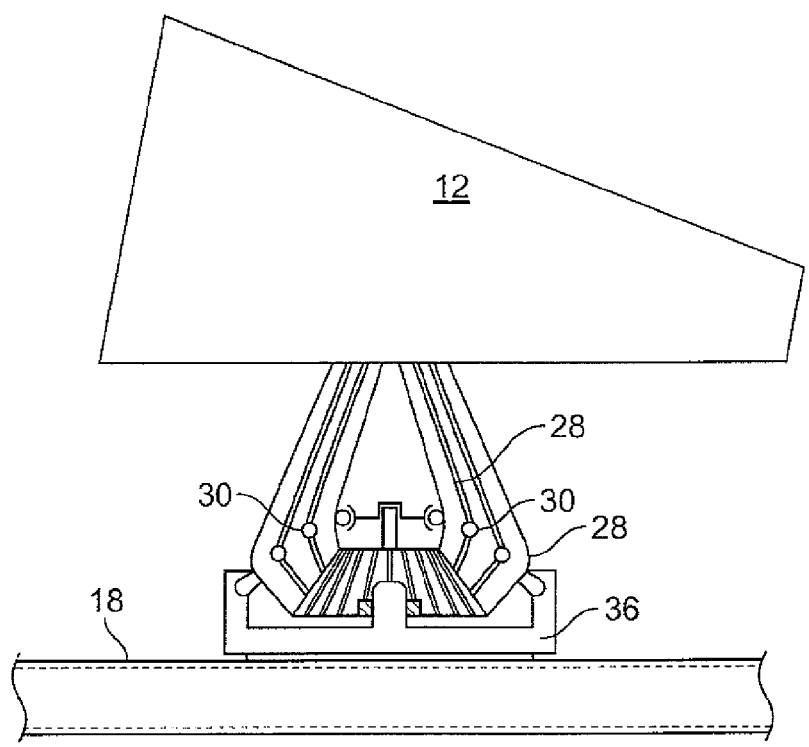
FIG. 2 is a partial cross-section of one embodiment of the present invention.

Turning now to FIG. 2, shown is one embodiment of the present invention where the cone 12 contacts a plurality of discreet disks. The disks shown in FIG. 2 are represented by numeral 28. In the example, a group of six independent disks are illustrated as one possible embodiment. It is to be appreciated by those skilled in the art that a plurality of individual disks 28 is adequate to achieve the desirable results of the present invention. In this manner, two or more disks have been found to be pragmatic and effective in this transmission. In the embodiment shown, the disks 28 comprise a flexible material which is in significant contrast to that which has been previously proposed in the art. In the prior art, the single disk commonly used in the variable transmission had to experience very significant forces and was susceptible to slippage between the points of contact of the disk with the cones. As a result, in the prior art a significant of additional gearing and clutching was required and this resulted in the variable transmission only working within a limited range of speeds. In order to increase the torque, more traction force is required between the cone 12 and disks (28). In a situation where a single disk is employed, any augmentation of the traction force is unachievable in view of the fact that the increased force will destroy either the surface of the cone or the surface of the disk or both. By the arrangement shown in FIG. 2, the significant limitations have been overcome; by providing a number of disks, there is clearly provided a greater degree of contact area (still without increase of spin losses usual for wide roller-cone contact), and further, this results in the clamping force being distributed over a broader cumulative area of the cone thus alleviating localized significant stresses. By providing the flexible aspect for the disks 28, the result is that they are adaptive or "dynamic" in a radial direction. The arrangements are pliant and yield like springs or elastics and this results in pressure equalization. Suitable material for the composition of the disks 28 includes steel, particularly bearing type steel, aluminum alloys, titanium, polymers including rubber, and the composites combining the above as well as including fiber and other filler type composites. In order to ensure fluid and unencumbered rotation between individual disks 28, spacers 30 may be included between the individual disks to facilitate smooth unencumbered rotation and assist in bearing the axial force imposed by either thrust generated by the cone-disk contact zone or axial force created by disk position actuator. The spacers may include suitable bearings such as ball bearings, washers or hydrodynamic bearings which may be used to achieve the result.

Figure 2A:
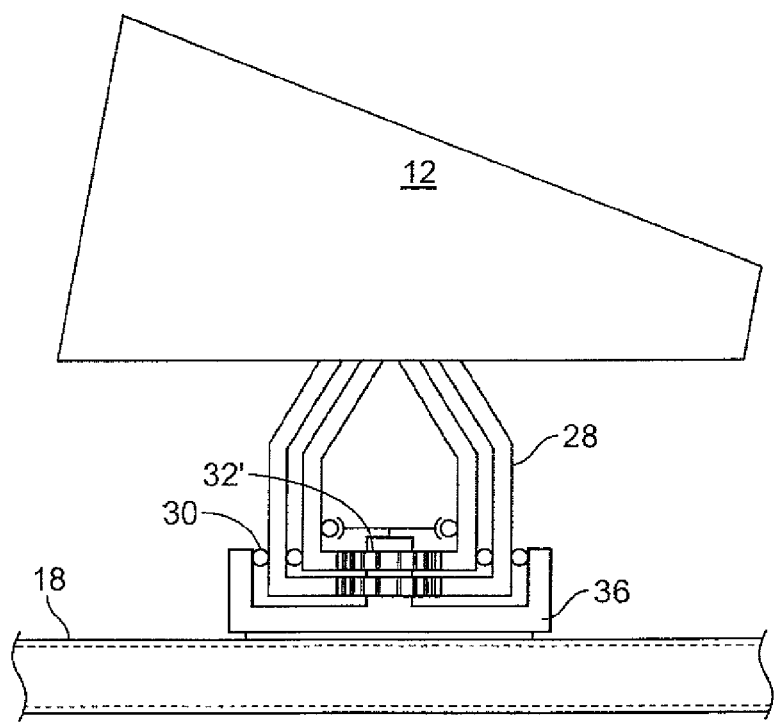
FIG. 2A is a further variation on the embodiment of FIG. 2.
Figure 3:
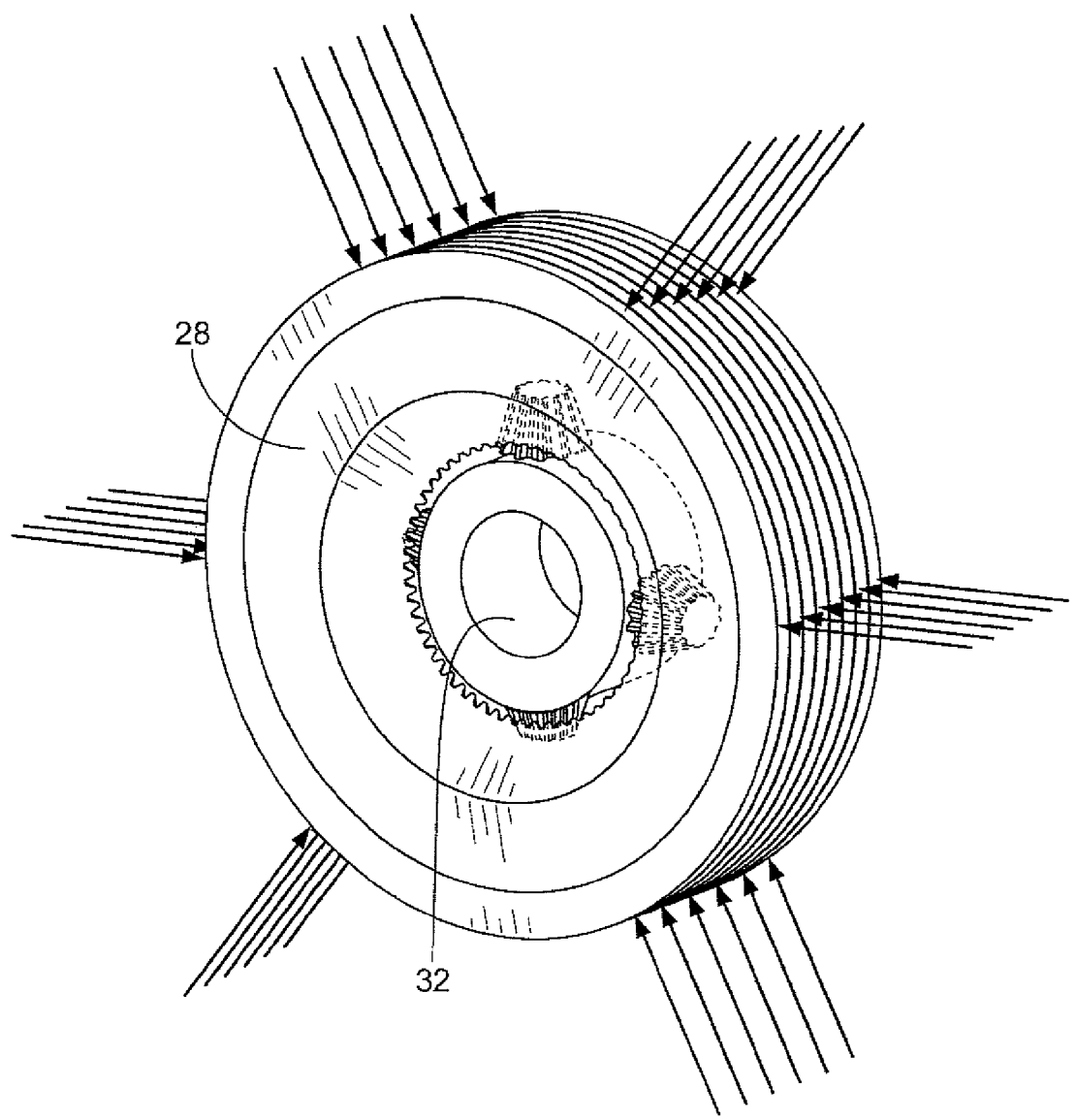
FIG. 3 is a perspective view of the disk array in one possible embodiment for use in the present invention.

FIG. 3 provides a perspective view of an assembly of n disks 28 within which is mounted for rotation gear member 32. Gear member 32 includes a plurality of conical gear members 34 spaced radially about the body of gear 32. Although this is shown as an embodiment, it will be appreciated by those skilled in the art that the arrangement in the absence of being a conical gear could be a split gear including bevel split gears for minimizing mechanical losses. Also, it has to be understood that the conical gear approach represents one possibility to provide a fixed ratio opposed velocities to the opposed disks; FIG. 2A illustrates an embodiment when this gear is split in several gears 32' and provides for equalized speeds of opposed disks to rotate in opposite direction relative to each other, still rotating with the carriage around the shaft 18.

Figure 2B:
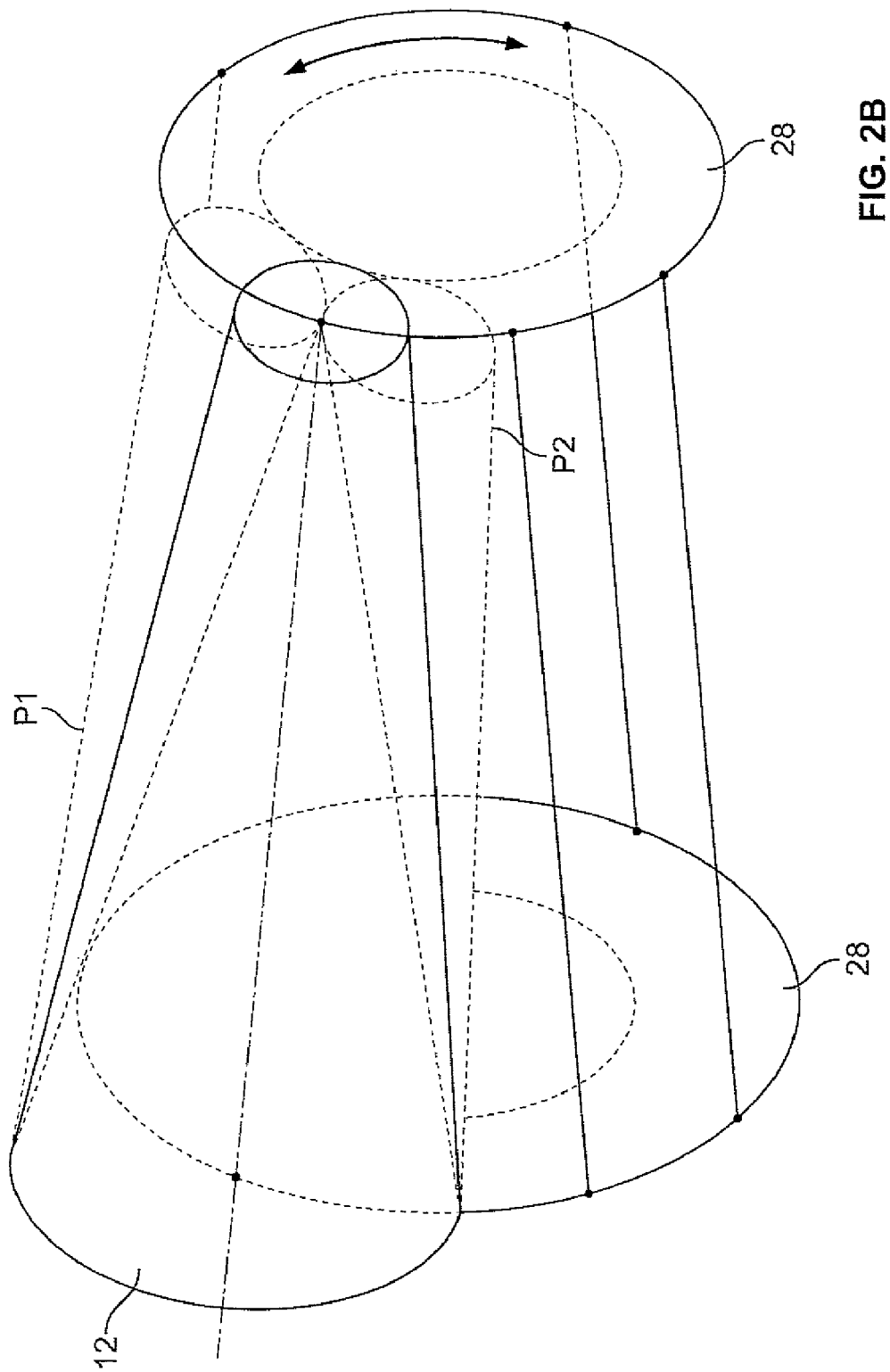
FIG. 2B is a schematic illustration of the cone disc assembly showing the displacement of the cones relative to he disk.

FIG. 2B illustrates the situation where the cone(s) 12 can be skewed or displaced relative to the disk(s) 28 for controlled misalignment As an example, the cone 12 shown may be relocated from its origin (solid line) to P1 or P2 (each dashed line) to assist in the control of, the disks 28 in terms of spin fluctuation clamping forces and more particularly; for forcing the disk(s) into a controlled position against the cone This can be achieved by movement of the mounting means (not shown) of the cones. The mounting arrangement is well known and an example is that provided by Raney supra. By allowing movement of the cone(s) 28 as indicated, the system is not only adaptive, but also it can be "tuned" to constantly adapted to differing situations. This is particularly advantageous in view of the other adjustments possible in the system.

Figure 5:
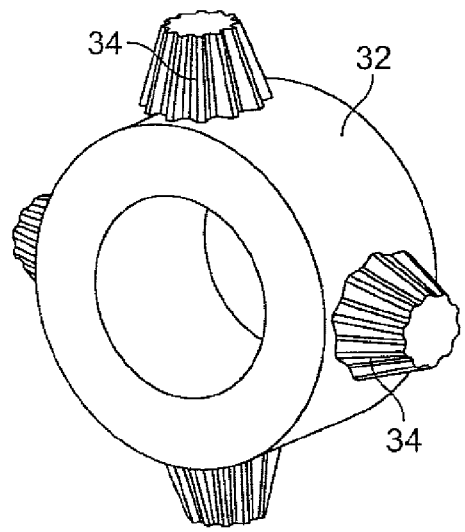
FIG. 5 is a perspective view of one embodiment of the conical gear member for use in the present invention.

As indicated above, gear 32 is mounted for rotation within the disk assembly shown in FIG. 3. The gear 32 is shown in one embodiment in FIG. 5. This arrangement ensures that all of the disks rotate. In this manner, opposed disks rotate in opposite directions relative to the conical gear with the entire package as shown in FIG. 3 rotating at the same time. Conical gear 32 is connected to a carriage member 36 shown in FIG. 2. The cariage is moveable axially along shaft 18 in order to provide translational motion of the disks along the cone surface.

Figure 4:
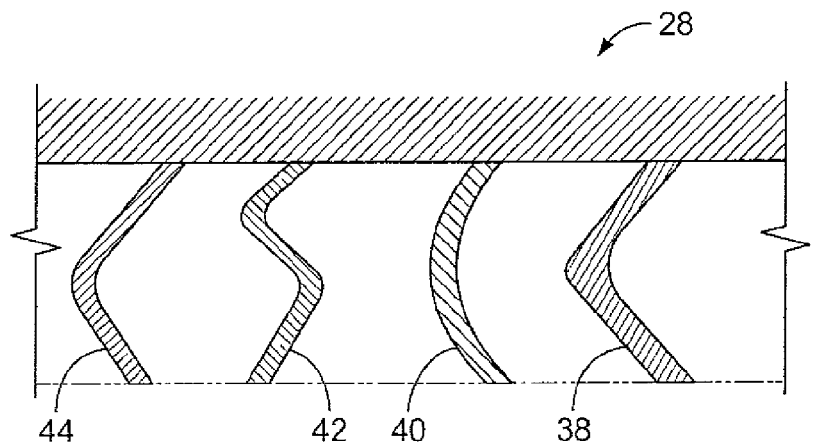
FIG. 4 is a partial cross-section of differing disk formations.

FIG. 4 illustrates a variety of different configurations of the disks in partial cross-sections 28 with different configurations comprising a chevron 38, a semi-circle 40, a sinusoidal or "Z" shape 42 and an arcuate shape 44. These are exemplary; other suitable formations will be appreciated by those skilled in the art.

Although it is not shown in the drawing, it will be appreciated that the carriage 36 and rotational gear member 32 will include some form of lubrication or traction fluid which can be radially distributed by the motion of the gear and dependent disks.

With respect to drive, it is clear that as long as there is relative motion between the gear 32 and cones 12, the disk network 28 will rotate. Accordingly, the cones may be driven by or driving a suitable drive network (not shown) such as that known from the prior art or, alternatively, drive gear 32 may be rotated by suitable means (not shown).

Figure 6:
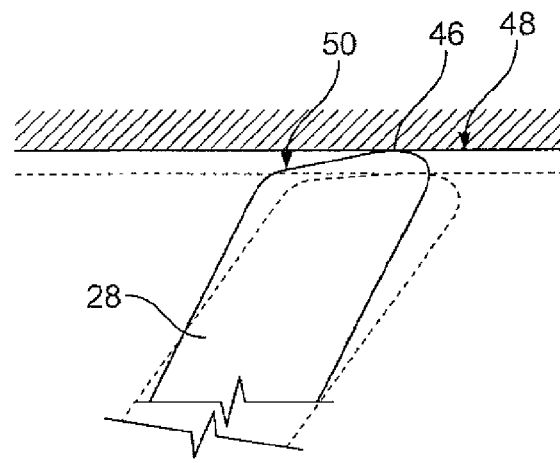
FIG. 6 is a partial cross-section of the periphery of a disk member illustrating the different radii thereof.

In order to ensure the positive contact through the film of traction fluid (not shown) and prevent premature wear of the disks and/or cones, the perimeter or peripheral edge 46 of each disk 28 can include at least two different radii, denoted by numerals 48 and 50, as best shown in FIG. 6. Under deformation due to the clamping force, the crown area of the disk will turn and the larger radius of it will have contact with cone, which will equalize contact Hertzian stress. Alternatively, by this provision, in the event that the peripheral edge 46 begins to wear, excessive friction or clamping force, the disk will have the provision for adaptation of these circumstances by providing a second area of contact with the cone in order to prevent slippage and to achieve the pressure dissipation and other significant advantages noted previously, thus allowing the assembly to adapt.

Figure 7:
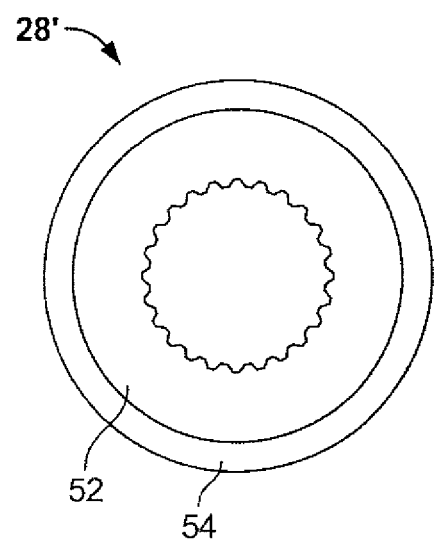
FIG. 7 is a perspective view of one alternative embodiment for the disk members.

Turning to possible alternatives, FIG. 7 is representative of one possible variation on the disk system. In FIG. 7 a disk denoted by numeral 28' is illustrated where the disk contains a central body 52 which may comprise a solid material which is non-compliant or elastic and which includes a peripheral skirt or covering crown 54, which may comprise flexible material capable of elastic deformation noted above.

Figure 8:
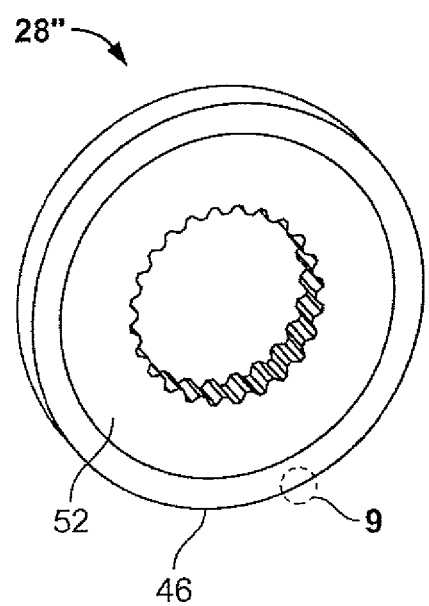
FIG. 8 is a view similar to FIG. 7, illustrating a further alternate embodiment.
Figure 9:
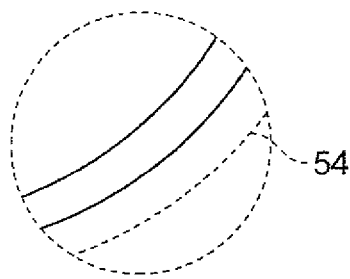
FIG. 9 is an enlarged view of the section denoted in FIG. 8.

Referring now to FIG. 8, it is a further variation on the disk arrangement with the variation being denoted by numeral 28". In this arrangement, the perimeter of the disk 28" may comprise a material which is activated by centripetal force for increasing the diameter of the periphery 46 of disk 28' so that the diameter of the disk is effectively expanded to the area denoted by the dashed line in FIG. 9, the dashed area being denoted by numeral 54. It is contemplated that each one of the individual disks could be effectively "tuned" so that not all of the disks reacts the same under the centripetal force. In this manner, one disk relative to another may have a different diameter to further assist in pressure dissipation and ensure a positive contact with minimum excessive force. Alternatively, the cone or cone axial support system can complement this and provide additional means for equalizing the disks load distribution.

Figure 10:
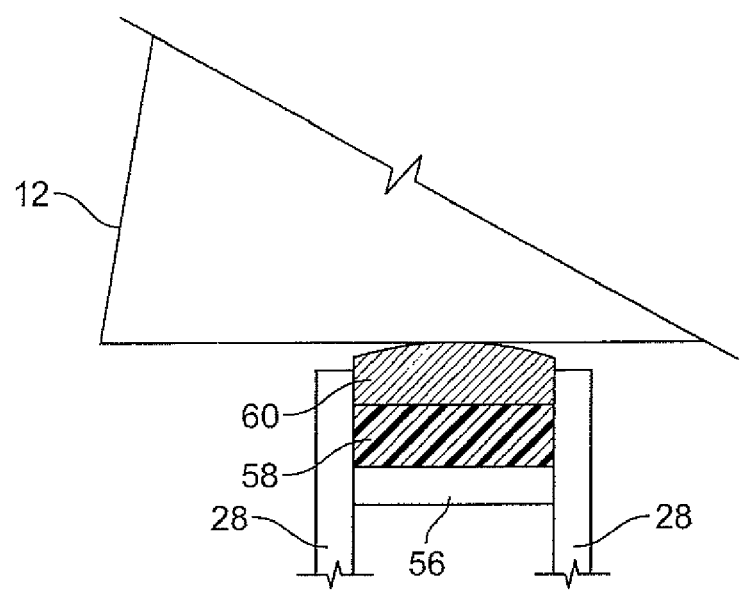
FIG. 10 is a partial cut-away view of a further alternative for the disk system.

Referring now to FIG. 10, shown is a further embodiment for the disk arrangement. The embodiment shown in cut-away cross-sectional view. In the embodiment, adjacent disks 28 are maintained in a spaced relationship by support 56. Support 56 acts to provide a receiving area for elastic material 58. The elastic material 58 can comprise any material that has been discussed herein previously with respect to the composition of the disks 28. The elastic material 58 further cushions ring 60, the latter being in contact with cone 12. This embodiment further provides for the adaptability of the disk and ring arrangement so that as the disks are moved radially along cone 12, the system is provided with effectively "a suspension" so that the arrangement can adapt to imperfections in the cone surface, irregular wear of the disk at the point of contact with gear 32 and other related anomalies which will naturally occur depending upon the stress experience by the system. Further, this embodiment facilitates the use of rigid disks. In this manner, the disk may comprise a material that is substantially inflexible owing to the fact that the elasticity or compliance is provided by the disposition of support 56 with elastic material 58.

Figure 11:
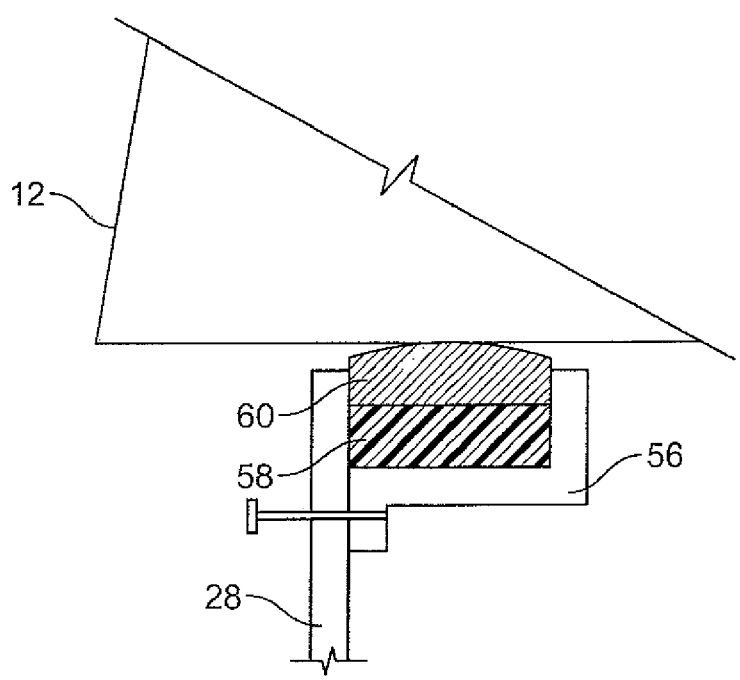
FIG. 11 is a further variation of FIG. 10.

With respect to FIG. 11, yet another variation is illustrated in a partially cut-away cross-section. In this arrangement, the support 56 projects radially from disk 28. Support 56 is mounted, as is schematically illustrated, to a single disk. This embodiment provides for the same mechanical features and advantages as that discussed with respect to FIG. 10.

Figure 12:
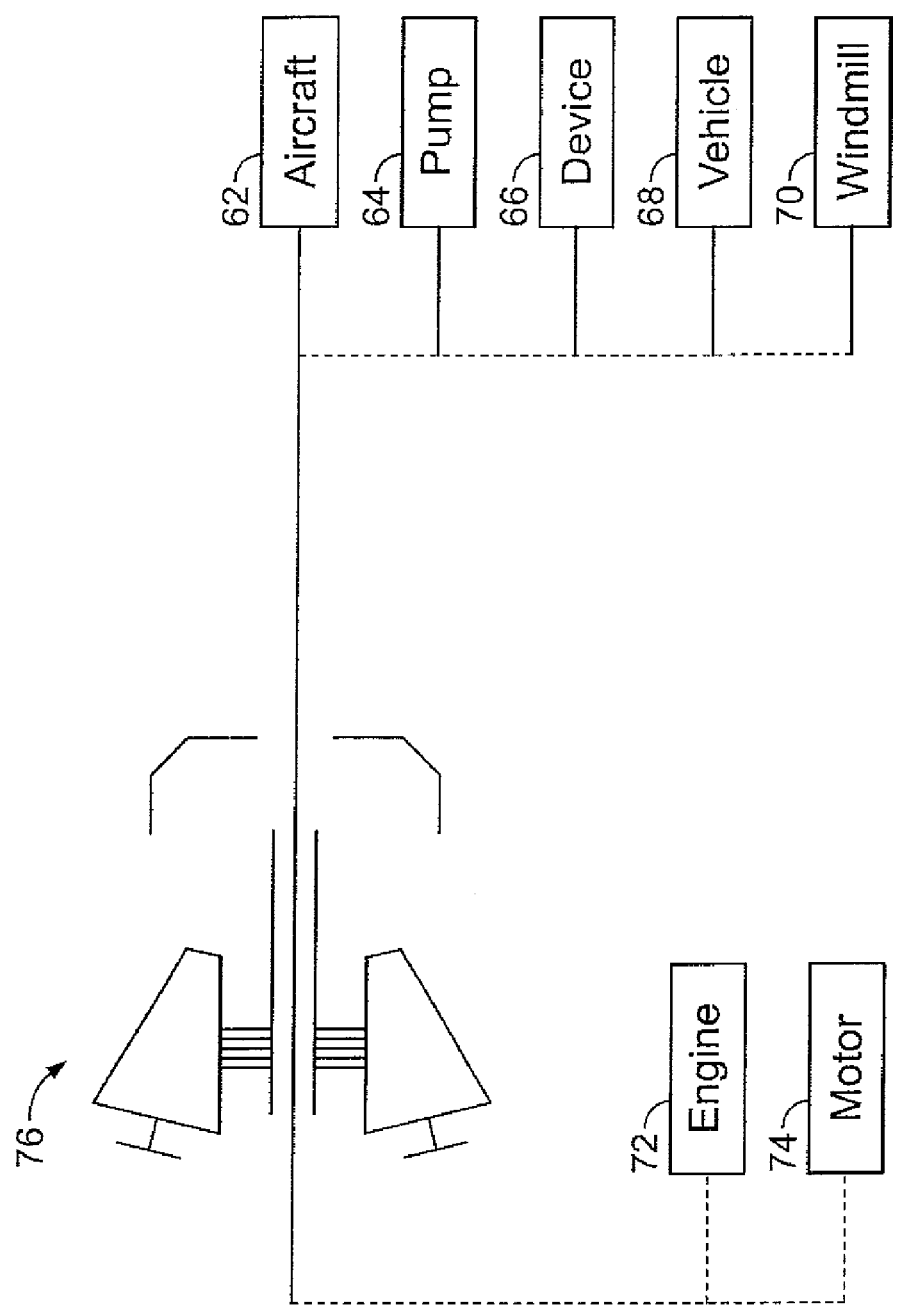
FIG. 12 is a schematic illustration of the variable transmission as contemplated for use with aircraft and other means.

It will be appreciated by those skilled in the art that the drive shaft discussed herein may be operatively associated with any suitable vehicle or device. To this end, FIG. 12 illustrates possible examples where numeral 62 represents an aircraft, numeral 64 a pump or generator, numeral 66 a device capable of using the output, numeral 68 being a vehicle i.e. a tractor, boat, etc., numeral 70 a windmill. As a further possibility numeral 72 represents an engine, and numeral 74 represents a motor.

The embodiment(s) of the invention described above is(are) intended to be exemplary only. The scope of the invention is therefore intended to be limited solely by the scope of the appended claims.

I claim:

1. A drive system suitable for use in a variable transmission, comprising:
 a plurality of rotatable and adjustable disk members;
 gear means adapted for contact with said plurality of disk members;
 carriage means for mounting said gear means and configured for axial movement along the axis of a rotatable drive shaft; and a rotatable cone adapted for contact with said plurality of disk members, said cone and said gear means connected for relative rotation by said plurality of disk members, said disk members being adjustable transversely relative to the axis of rotation for maintaining positive contact with said rotatable cone.

2. The drive system as set forth in claim 1, wherein said plurality of disk members comprise a material which is elastically deformable for effecting said adjustment.

3. The drive system as set forth in claim 1, wherein said plurality of disk members comprise an array of spaced apart disk members disposed in coaxial relation.

4. The drive system as set forth in claim 3, wherein said plurality of disk members are spaced with spacer means capable of facilitating independent rotation between adjacent disks.

5. The drive system as set forth in claim 3, wherein each disk of said plurality of elastic disk members includes a contoured periphery or crown having at least two different radii for ensuring contact of said periphery with the surface of said cone during rotation.

6. The drive system as set forth in claim 1, wherein said plurality of disk members includes means for distributing lubrication.

7. The drive system as set forth in claim 1, wherein said plurality of disk members are composite disks, each having a rigid body and an elastically deformable periphery.

8. The drive system as set forth in claim 1, wherein said disk members each include elastically deformable periphery for effecting changes in the diameter of said disk during rotation for ensuring contact of said periphery of said cone.

9. The drive system as set forth in claim 1, wherein said disks have a profile produced by rotational translation of a shape selected from the group consisting of a chevron, sinusoidal, a semicircle or a crescent.

10. The drive system as set forth in claim 1, wherein output power from said drive system is mechanically transferable to a gear means integrating or differentiating power from cone and disk members.

11. The drive system as set forth in claim 1, wherein said drive shaft is a vehicle drive shaft.

12. The drive system as set forth in claim 1, wherein said drive shaft is an engine driveshaft.

13. The drive system as set forth in claim 1, wherein said drive shaft is a windmill or windmill generator drive shaft.

14. The drive system as set forth in claim 1, wherein said drive shaft is an aircraft driveshaft.

15. The drive system as set forth in claim 1, wherein said drive shaft is a pump shaft.

16. A variable transmission, comprising:
a drive shaft;
a plurality of elastically deformable disk members;
gear means adapted for contact with said plurality of disk members;
carriage means for mounting said gear means and configured for axial movement along the axis of said drive shaft;
a plurality of rotatable cones mounted in coaxial relation about said plurality of disk members, said cones and said conical gear means connected for relative rotation by said plurality of disk members, said disk members being elastically and dynamically deformable transversely relative to the axis of rotation for maintaining positive contact with said cones for generating output power during rotation; and
differential gear means for receiving said output power.

17. The variable transmission as set forth in claim 16, wherein said cones drive said disks.

18. The variable transmission as set forth in claim 16, wherein said conical gear means drives said disks.

19. The variable transmission as set forth in claim 16, wherein said plurality of disk members comprise an array of coaxially arranged discreet members.

20. The variable transmission as set forth in claim 19, wherein said array of coaxially arranged discreet members are differentially rotatable.

21. The variable transmission as set forth in claim 16, wherein said differential gear means includes planetary gear means, ring gear means and sun gear means.

22. The variable transmission as set forth in claim 16, wherein said transmission includes an even number of cones coaxially arranged about said disks.

* * * * *